United States Patent
Okuma

(10) Patent No.: US 9,605,724 B2
(45) Date of Patent: Mar. 28, 2017

(54) BRAKE ASSEMBLY HAVING A CAMSHAFT SENSOR MODULE

(71) Applicant: ArvinMeritor Technology, LLC, Troy, MI (US)

(72) Inventor: Ryo Okuma, Waterford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 14/316,231

(22) Filed: Jun. 26, 2014

(65) Prior Publication Data

US 2015/0377311 A1   Dec. 31, 2015

(51) Int. Cl.

| F16D 66/00 | (2006.01) |
| F16D 65/38 | (2006.01) |
| F16D 65/22 | (2006.01) |
| F16D 125/30 | (2012.01) |
| F16D 66/02 | (2006.01) |
| F16D 125/32 | (2012.01) |

(52) U.S. Cl.
CPC ............ *F16D 66/00* (2013.01); *F16D 65/22* (2013.01); *F16D 65/38* (2013.01); *F16D 66/025* (2013.01); *F16D 2066/003* (2013.01); *F16D 2125/30* (2013.01); *F16D 2125/32* (2013.01)

(58) Field of Classification Search
CPC ............ F16D 66/025; F16D 2206/003; F16D 2125/30; F16D 2125/32

USPC ........ 188/1.11 L, 1.11 E, 329, 330, 332, 338, 188/339

See application file for complete search history.

(56) References Cited

U.S. PATENT DOCUMENTS

| 5,253,735 | A | * | 10/1993 | Larson et al. ............ 188/1.11 L |
| 5,339,069 | A | * | 8/1994 | Penner .................... B60T 17/22 |
| | | | | 116/208 |
| 6,105,730 | A | * | 8/2000 | Ekeroth ................... 188/1.11 L |
| 8,181,752 | B2 | | 5/2012 | Philpott |
| 2009/0050418 | A1 | * | 2/2009 | Vargas et al. ............ 188/1.11 L |
| 2011/0241866 | A1 | * | 10/2011 | Todd et al. .................... 340/453 |
| 2013/0112036 | A1 | * | 5/2013 | Miller ..................... F16D 65/22 |
| | | | | 74/567 |
| 2014/0034427 | A1 | * | 2/2014 | Seglo et al. ............ 188/1.11 W |
| 2014/0246280 | A1 | * | 9/2014 | Jones et al. .................... 188/78 |
| 2014/0360828 | A1 | * | 12/2014 | Mitts ....................... F16D 65/22 |
| | | | | 188/330 |

OTHER PUBLICATIONS

Novotechnik, Siedle Group, Angle Sensor non-contacting, RSC3200 Series, Copyright—Apr. 2010.

* cited by examiner

*Primary Examiner* — Thomas Irvin
(74) *Attorney, Agent, or Firm* — Brooks Kushman P.C.

(57) ABSTRACT

A brake assembly that may have a camshaft sensor module. The camshaft sensor module may include a sensor that may generate a signal indicative of rotation of a camshaft. A sensor bracket may hold the sensor in a fixed position relative to a bracket assembly that may receive the camshaft.

20 Claims, 4 Drawing Sheets

BRAKE ASSEMBLY HAVING A CAMSHAFT SENSOR MODULE

TECHNICAL FIELD

This patent application relates to a brake assembly having a camshaft sensor module.

BACKGROUND

A disc brake assembly having an overstroke sensor is disclosed in U.S. Pat. No. 8,181,752.

SUMMARY

In at least one embodiment, a brake assembly is provided. The brake assembly may include a camshaft, a bracket assembly, and a camshaft sensor module. The camshaft may be configured to rotate about an axis. The bracket assembly may have a camshaft tube that may receive the camshaft. The camshaft sensor module may be disposed proximate an end of the camshaft. The camshaft sensor module may include a hub, a sensor, and a sensor bracket. The hub may be disposed proximate the end of the camshaft. The sensor may be disposed proximate the hub and may generate a signal indicative of rotation of the camshaft. The sensor bracket may hold the sensor in a fixed position relative to the bracket assembly.

In at least one embodiment, a brake assembly is provided. The brake assembly may include a camshaft, a bracket assembly, and a camshaft sensor module. The camshaft may be configured to rotate about an axis to actuate a brake pad assembly. The bracket assembly may rotatably support the camshaft. The camshaft sensor module may be coupled to the camshaft. The camshaft sensor module may include a hub, a sensor, and a sensor bracket. The hub may be coupled to the camshaft. The hub may have a hub shaft that may be spaced apart from and may rotate with the camshaft. The sensor may be disposed proximate the hub shaft and may generate a signal indicative of rotation of the camshaft. The sensor bracket may be disposed proximate the sensor. The sensor bracket may hold the sensor in a fixed position relative to the bracket assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
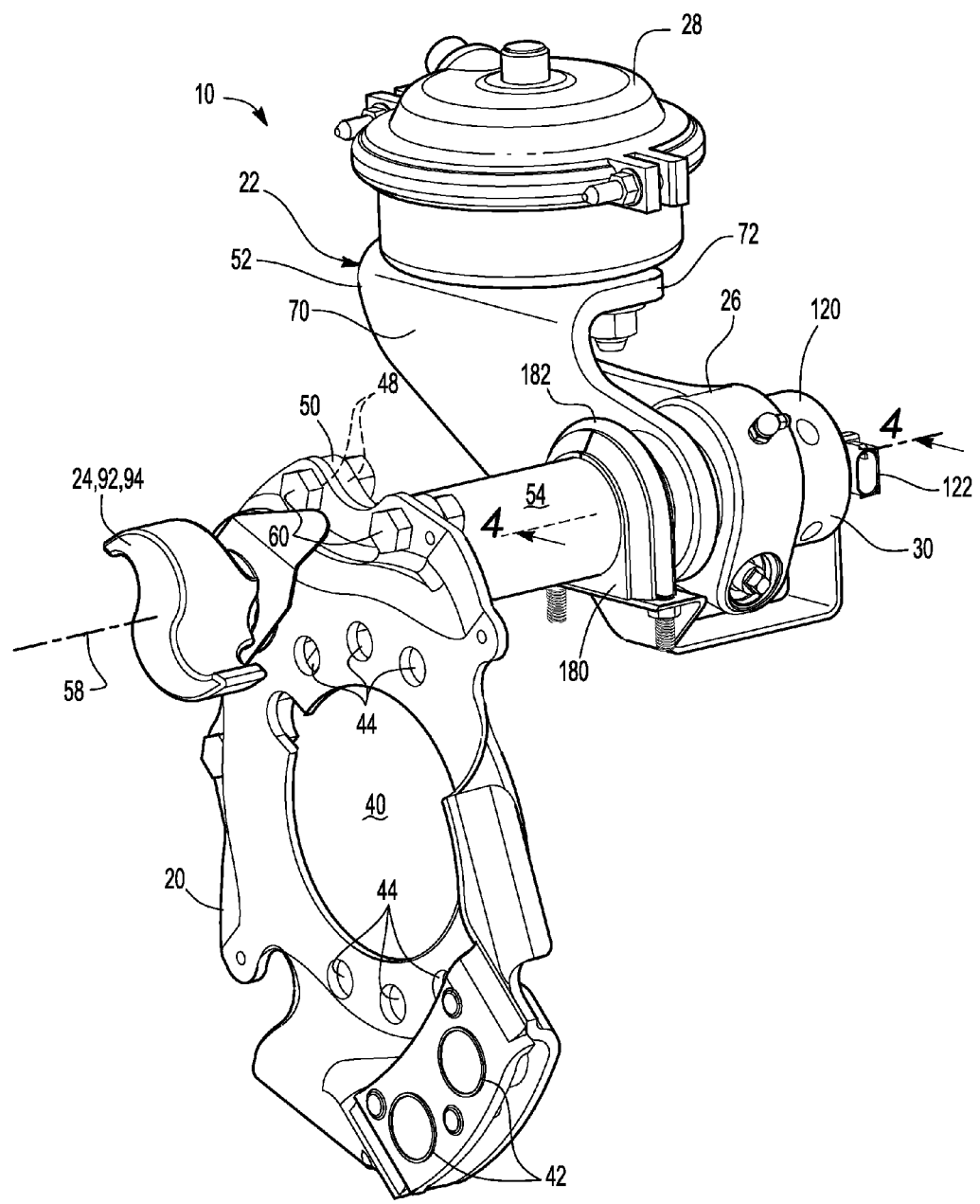
FIGS. 1 and 2 are perspective views of an exemplary brake assembly having a camshaft sensor module.

Referring to FIG. 1, a portion of an exemplary brake assembly 10 is shown. The brake assembly 10 may be provided with a vehicle, such as a motor vehicle like a truck, bus, farm equipment, mining equipment, military transport or weaponry vehicle, or cargo loading equipment for land, air, or marine vessels. In addition, the brake assembly 10 may be provided on a trailer that may be coupled to or may be provided with a motor vehicle.

The brake assembly 10 may be a friction brake that may be configured to slow or inhibit rotation of at least one associated wheel. In FIG. 1, the brake assembly 10 has a drum brake configuration. In a drum brake configuration, a brake drum may extend continuously around brake pad assemblies that may be configured to engage the brake drum to slow the rotation of an associated wheel. The brake drum may be disposed between a wheel and a wheel hub assembly that may rotatably support the wheel. The brake drum and brake pad assemblies are not shown in FIG. 1 so that other components of the brake assembly 10 may be more clearly depicted. Examples of brake pad assemblies and a drum brake configuration are disclosed in U.S. patent application Ser. No. 14/027,595, which is assigned to the assignee of the present application and is hereby incorporated by reference in its entirety. In at least one embodiment, the brake assembly 10 may include a spider 20, a bracket assembly 22, a camshaft 24, a slack adjuster 26, an actuator 28, and a camshaft sensor module 30.

Figure 2:
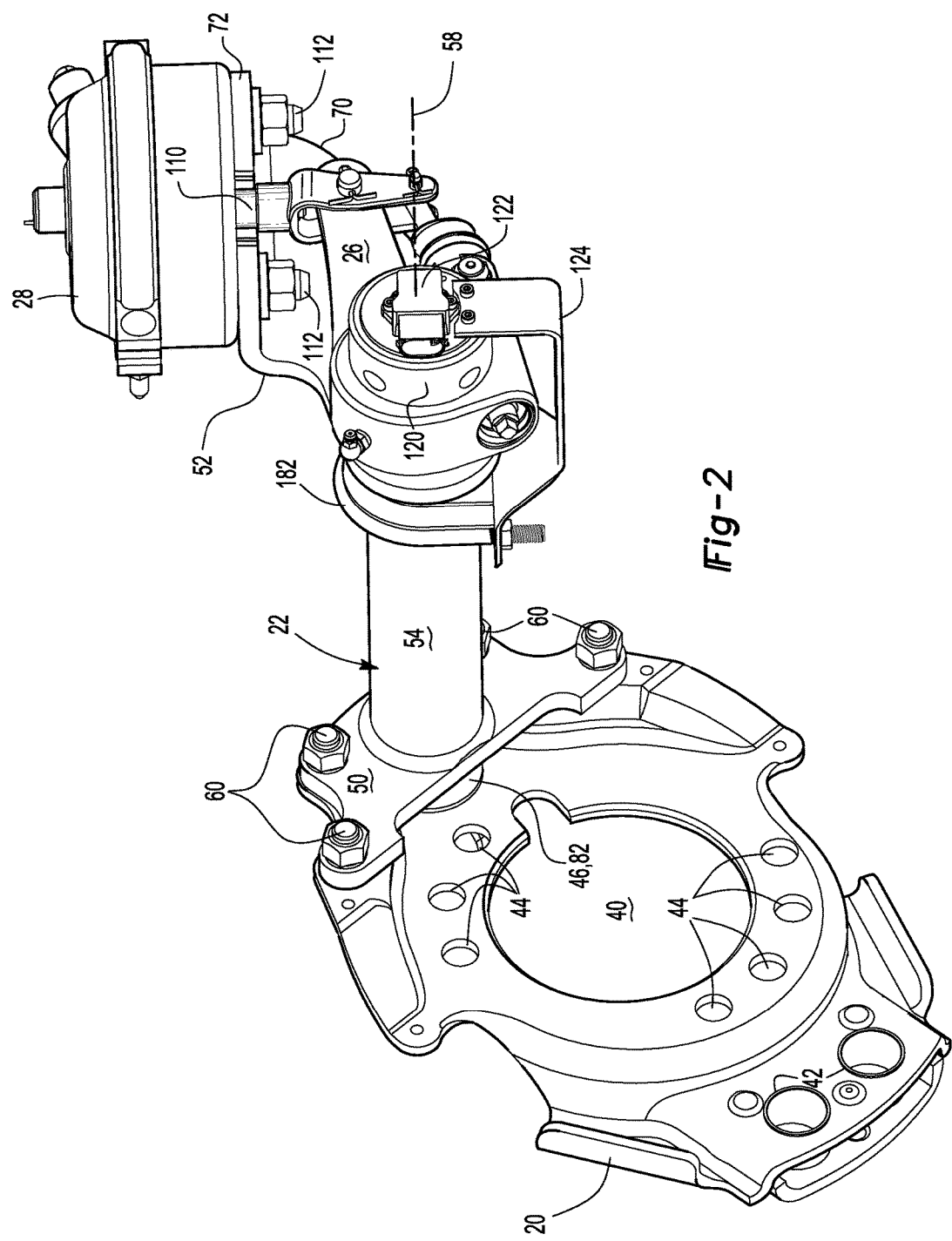

Referring to FIGS. 1 and 2, the spider 20 may support various components of the brake assembly 10. In addition, the spider 20 may facilitate mounting of the brake assembly 10 to the vehicle. For example, the spider 20 may be fixedly disposed on or fixedly positioned with respect to an axle assembly or a steering knuckle. In at least one embodiment, the spider 20 may include a main opening 40 through which an axle and/or a spindle may extend. For example, a spindle may extend through the main opening 40 and may support one or more wheel bearings that may support and facilitate rotation of a wheel assembly. The spider 20 may also include at least one anchor pin hole 42, at least one spider mounting hole 44, a camshaft opening 46, and one or more bracket assembly mounting holes 48.

The anchor pin hole 42 may receive an anchor pin that may facilitate mounting and operation of a brake pad assembly will be discussed in more detail below. In the embodiment shown, two anchor pin holes 32 are provided that are generally disposed opposite the bracket assembly 22 and the camshaft 24. Each anchor pin hole 42 may receive a different anchor pin, which in turn may support different brake pad assemblies. The anchor pin may be fixedly disposed in the anchor pin hole 42 such that the anchor pin does not rotate with respect to the spider 20.

A spider mounting hole 44 may facilitate mounting of the spider 20 to the vehicle. In FIG. 1, a plurality of spider mounting holes 34 are arranged around the main opening 40. Each spider mounting hole 44 may receive a fastener, such as a bolt, that may extend through the spider mounting hole 44 and couple the spider 20 to another component, such as an axle assembly or a steering knuckle.

The camshaft opening 46, which is best shown in FIG. 2, may receive the camshaft 24. The camshaft 24 may extend through the camshaft opening 46 to engage one or more brake pad assemblies.

One or more bracket assembly mounting holes 48, which are best shown in FIG. 1, may extend at least partially through the spider 20. The bracket assembly mounting holes 48 may facilitate mounting of the bracket assembly 22 to the spider 20 as will be discussed in more detail below.

Figure 4:
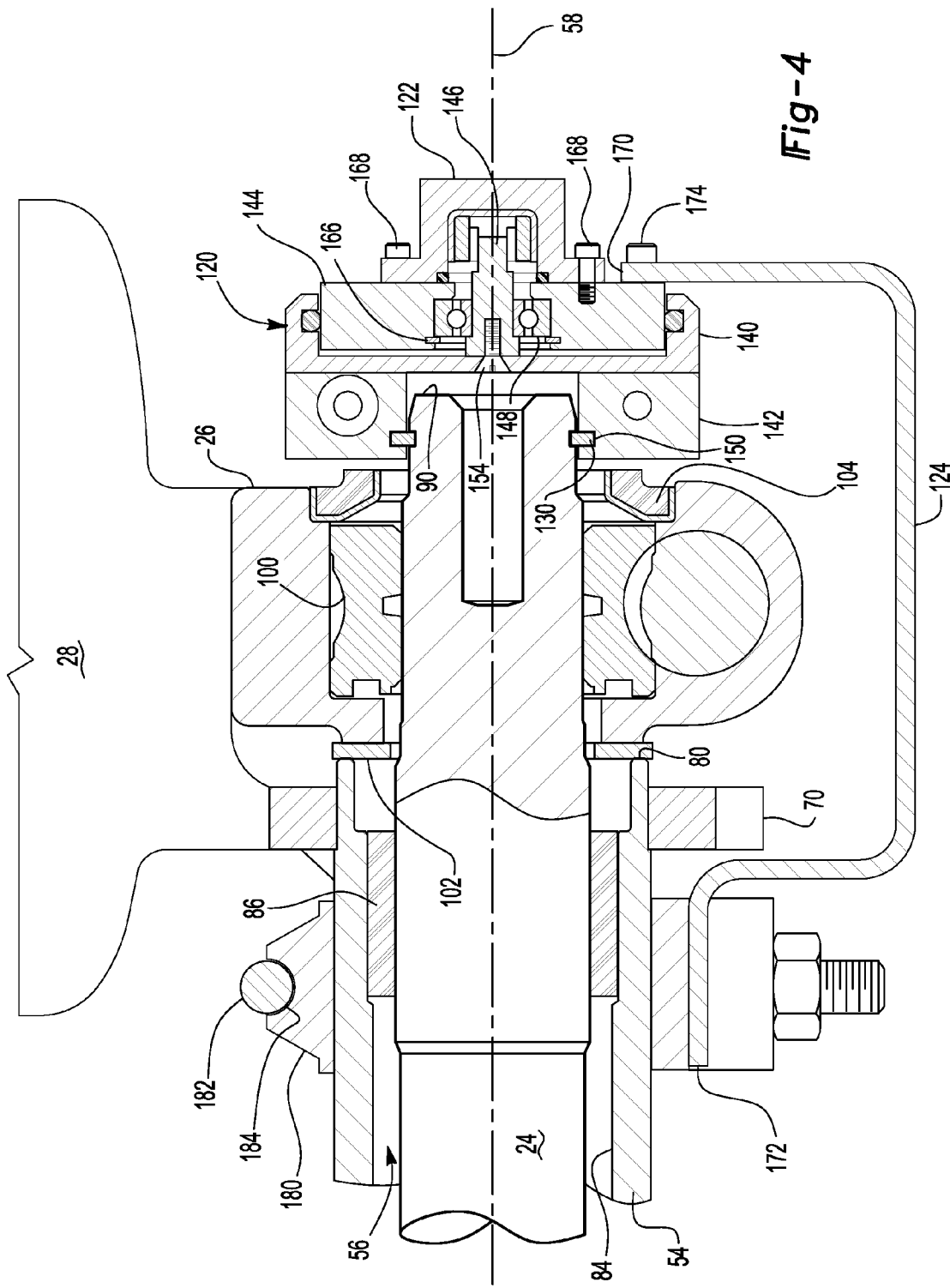
FIG. 4 is a section view of the brake assembly and the camshaft sensor module along section line 4-4.

The bracket assembly 22 may facilitate coupling of the camshaft 24 to the spider 20. In at least one embodiment, the bracket assembly 22 may include a mounting flange 50, a brake wing 52, and a camshaft tube 54. In addition, the bracket assembly 22 may have a hole 56, which is best shown in FIG. 4, that may receive the camshaft 24. The hole 56 may be a through hole that may extend through the bracket assembly 22. The hole 56 may extend along an axis 58 and may be defined by hole portions in the mounting flange 50, the brake wing 52, and the camshaft tube 54 as will be discussed in more detail below.

The mounting flange 50 and the brake wing 52 may be disposed proximate opposite ends of the camshaft tube 54. The mounting flange 50 and the brake wing 52 may be coupled to the camshaft tube 54 in any suitable manner. For example, the mounting flange 50 and brake wing 52 may be fixedly coupled to the camshaft tube 54 by welding, an adhesive, interference fit, with one or more fasteners, or combinations thereof. In addition, the mounting flange 50 and the brake wing 52 may overlap each other in a male/female relationship in one or more embodiments. For example, the mounting flange 50 and/or the brake wing 52 may have a male configuration and a corresponding portion of the camshaft tube 54 may have a female configuration, or vice versa.

Referring to FIGS. 1 and 2, the mounting flange 50 may facilitate mounting of the bracket assembly 22 to the spider 20. The mounting flange 50 may be spaced apart from the brake wing 52 and may be fixedly coupled to the camshaft tube 54 or fixedly positioned with respect to the camshaft tube 54. The mounting flange 50 may define a portion of the hole 56 through which the camshaft 24 may extend. In addition, the mounting flange 50 may include at least one mounting hole that may be aligned with a corresponding bracket assembly mounting hole 48 on the spider 20. The mounting hole may receive a fastener 60 that may couple the mounting flange 50 to the spider 20.

The brake wing 52 may be coupled to the camshaft tube 54. The brake wing 52 may be spaced apart from the spider 20 and may be fixedly coupled to the camshaft tube 54 opposite the mounting flange 50. The brake wing 52 may define a portion of the hole 56 through which the camshaft 24 may extend. In at least one embodiment, the brake wing 52 may also include a side wall 70 and a flange wall 72.

The side wall 70 may be disposed proximate the camshaft tube 54. For example, the side wall 70 may include a hole that may receive the camshaft tube 54. As is best shown in FIG. 4, the side wall 70 may be disposed near an end of the camshaft tube 54 and may extend substantially perpendicular to the camshaft tube 54 and/or the axis 58. The camshaft tube 54 may be coupled to the side wall 70 in any suitable manner, such as by welding.

Referring to FIGS. 1 and 2, the flange wall 72 may extend from an end of the side wall 70. In addition, the flange wall 72 may extend away from the spider 20. The flange wall 72 may support the actuator 28.

Referring to FIGS. 1, 2, and 4, the camshaft tube 54 may extend from the mounting flange 50 to the brake wing 52. The camshaft tube 54 may have a generally tubular configuration and may define a portion of the hole 56 through which the camshaft 24 may extend. In at least one embodiment, the camshaft tube 54 may have a first camshaft tube end 80, a second camshaft tube end 82, and an inner tube surface 84.

The first camshaft tube end 80, which is best shown in FIG. 4, may be disposed proximate the slack adjuster 26. The first camshaft tube end 80 may also be disposed near the brake wing 52 and may be received in a hole in the brake wing 52.

The second camshaft tube end 82, which is best shown in FIG. 2, may be disposed opposite the first camshaft tube end 80. The second camshaft tube end 82 may be disposed proximate the spider 20 and/or the mounting flange 50. For example, the second camshaft tube end 82 may be received in a hole in the mounting flange 50 and or a hole in the spider 20. As such, the second camshaft tube and 82 may terminate at the mounting flange 50 or may extend to the spider 20.

The inner tube surface 84, which is best shown in FIG. 4, may extend from the first camshaft tube end 80 to the second camshaft tube end 82 and may at least partially define the hole 56. For example, the inner tube surface 84 may include a circumferential surface that may be radially disposed about the axis 58 and that may face toward and may be spaced apart from the camshaft 24. The inner tube surface 84 may be spaced apart from the camshaft 24 to facilitate rotation of the camshaft 24 within the camshaft tube 54.

The hole 56 of the camshaft tube 54 may receive various components in addition to the camshaft 24. For example, the hole 56 may receive a support member 86, such as a bearing or bushing that may extend around the camshaft 24 to rotatably support the camshaft 24. In addition, the hole 56 may receive a lubricant, such as grease, that may help lubricate the support member 86.

The camshaft 24 may extend along and may rotate about the axis 58. The camshaft 24 may extend through camshaft opening 46 in the spider 20 and the hole 56 in the bracket assembly 22. The camshaft 24 may include a first end 90 and a second end 92. The first end 90, which is best shown in FIG. 4, may be disposed proximate and may be coupled to the camshaft sensor module 30. The second end 92, which is best shown in FIG. 1, may be disposed opposite the first end 90. A cam 94 may be disposed at the second end 92. The cam 94 may be configured as an S-cam that may be configured to actuate one or more brake pad assemblies when the camshaft 24 is rotated. The brake pad assemblies may include a brake shoe and a friction material.

The brake shoe may be a structural member of a brake pad assembly. The brake shoe may be pivotally mounted to the spider 20 at a first end via the anchor pin. For example, the brake shoe may pivot about an outer surface or circumference of the anchor pin when the brake pad assembly is actuated. An opposite end of the brake shoe may have a cam roller that may be configured to engage the cam 94 of the camshaft 24.

The friction material, which may also be called a brake lining, may be disposed on an outer surface of the brake shoe and may face toward the brake drum. The friction material may engage the brake drum during vehicle braking and may be spaced apart from the brake drum when the friction braking is not being applied.

Rotation of the camshaft 24 may rotate the cam 94 about the axis 58. The cam 94 may engage the cam roller on the brake shoe. As such, rotation of the camshaft 24 may exert force on a brake shoe and cause an associated brake pad assembly to pivot about the anchor pin and actuate the brake pad assembly such that the friction material moves toward or engages an inner surface of the brake drum to brake or slow or inhibit rotation of an associated wheel.

Referring to FIGS. 2 and 4, the slack adjuster 26 may be provided to compensate for brake wear or wear of the friction material of a brake pad assembly. The slack adjuster 26 may be disposed on the camshaft 24 near the first end 90 of the camshaft 24. For example, the slack adjuster 26 may have a mounting hole that may receive the camshaft 24. Moreover, the slack adjuster 26 may be coupled to the camshaft 24 such that the slack adjuster 26 does not rotate about the axis 58 with respect to the camshaft 24. The slack adjuster 26 may be coupled to the camshaft 24 in any suitable manner. For example, the slack adjuster 26 may be coupled to the camshaft 24 with a fastener like a snap ring, and adhesive, or mating features such as mating splines that may be provided on the slack adjuster 26 and a camshaft 24. Such features may be provided on a slack adjuster mounting ring 100 that may be provided with the slack adjuster 26.

A washer 102 may be disposed between the slack adjuster 26 and the first camshaft tube end 80 of the camshaft tube 54. The washer 102 may help inhibit axial movement of the slack adjuster 26 and may separate the slack adjuster 26 from the camshaft tube 54.

A slack adjuster seal assembly 104 may be disposed opposite the washer 102 and may extend to or toward the camshaft sensor module 30. The slack adjuster seal assembly 104 may engage the camshaft sensor module 30 and may help inhibit contaminants from entering the slack adjuster 26.

The actuator 28 may be provided to actuate the camshaft 24 or rotate the camshaft 24 about the axis 58. The actuator 28 may be of any suitable type, such as a pneumatic, hydraulic, electrical, or electromechanical actuator. The actuator 28 may include an actuator shaft 110, which is best shown in FIG. 2, that may extend to or toward the slack adjuster 26. For example, the actuator shaft 110 may extend through an actuator shaft opening in the flange wall 72 of the brake wing 52. The actuator 28 may actuate the actuator shaft 110 and may move between a retracted position and an extended position. In the retracted position, the camshaft 24 may be positioned such that a brake pad assembly does not engage the brake drum to brake or inhibit rotation of an associated vehicle wheel assembly. In the extended position, the actuator 28 may rotate the camshaft 24 about the axis 58 and may actuate the brake pad assemblies to move toward and engage the brake drum to inhibit rotation of an associated wheel hub assembly. The actuator 28 may be fixedly mounted to the brake wing 52. For example, the actuator 28 may include one or more mounting features 112, such as a threaded mounting stud, that may extend through a hole in the brake wing 52 and that may receive a washer and nut to fixedly couple the actuator 28 to the brake wing 52.

Figure 3:
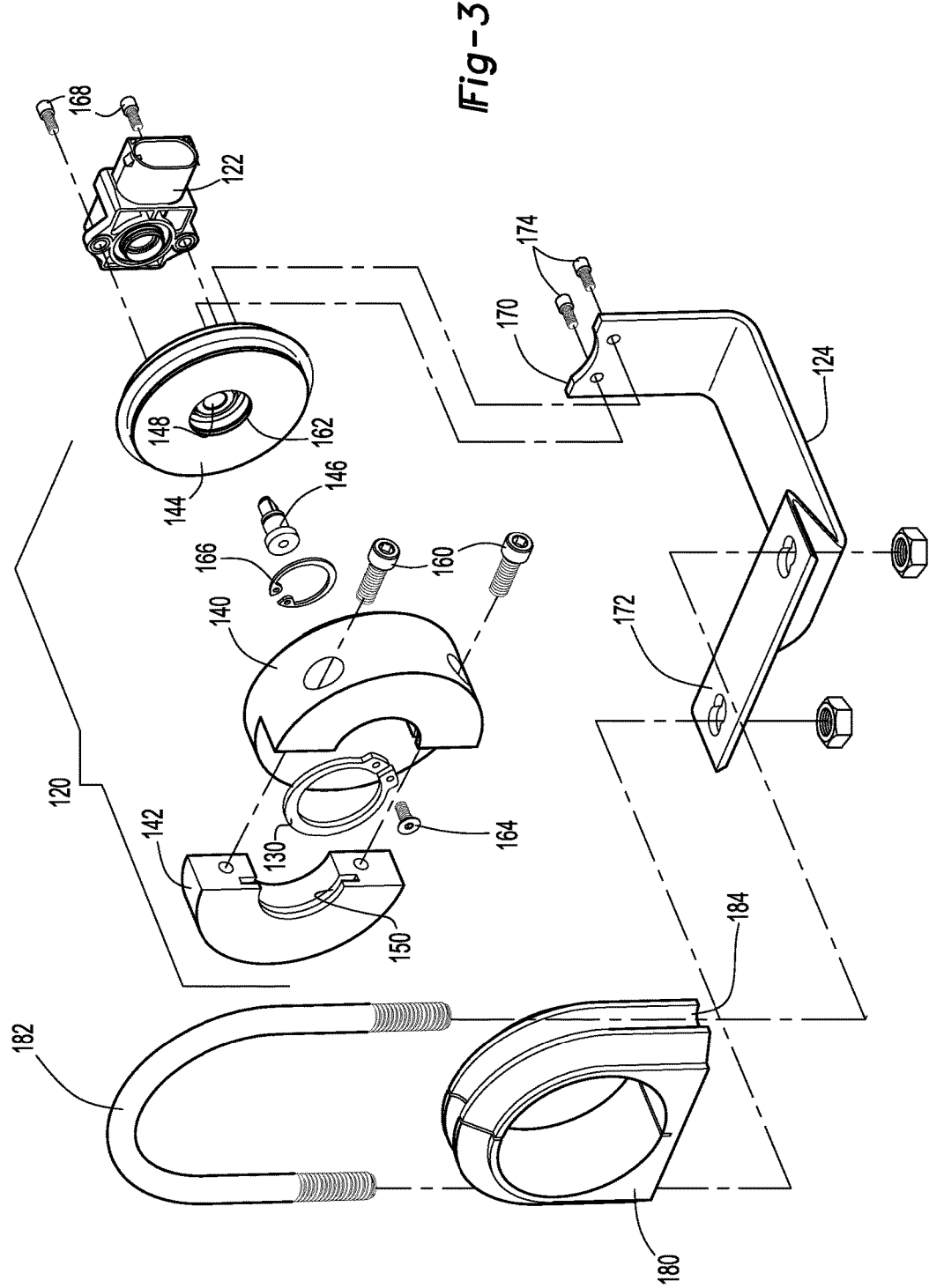
FIG. 3 is an exploded view of the camshaft sensor module of FIG. 1.

Referring to FIGS. 2-4, the camshaft sensor module 30 may be disposed proximate the first end 90 of the camshaft 24. The camshaft sensor module 30 may be coupled to the bracket assembly 22 and may be configured to detect rotation of the camshaft 24. In at least one embodiment, the camshaft sensor module 30 may include a hub 120, a sensor 122, and a sensor bracket 124.

The hub 120 may be disposed proximate the first end 90 of the camshaft 24. As such, the hub 120 may be disposed proximate the slack adjuster 26 and may be spaced apart from the camshaft tube 54, or disposed on an opposite side of the slack adjuster 26 from the camshaft tube 54. The hub 120 may also be disposed between the slack adjuster 26 and the sensor 122.

At least a portion of the hub 120 may be fixedly positioned with respect to the camshaft 24. As such, at least a portion of the hub 120 may rotate with the camshaft 24 about the axis 58 and may rotate with respect to the camshaft tube 54. The hub 120 may be fixedly coupled to the camshaft 24 in any suitable manner, such as with a fastener like a snap ring 130, and adhesive, or an interference fit. For example, the snap ring 130 may be received in a snap ring groove that may be provided with the camshaft 24.

In at least one embodiment, the hub 120 may include a plurality of components, such as a first hub portion 140, a second hub portion 142, a third hub portion 144, a hub shaft 146, and an alignment feature 148.

The first hub portion 140 may be disposed between the slack adjuster 26 and the sensor 122. The first hub portion 140 may at least partially extend around the camshaft 24. The first hub portion 140 may include a portion of a snap ring groove 150 that may receive the snap ring 130. In addition, the first hub portion 140 may have an opening that may be configured to receive the third hub portion 144.

The second hub portion 142 may be mounted to the first hub portion 140 such that the second hub portion 142 may be fixedly positioned with respect to the first hub portion 140. The first hub portion 140 and the second hub portion 142 may cooperate to receive the camshaft 24. For example, the first hub portion 140 and the second hub portion 142 may cooperate to define an opening that receives the camshaft 24 and may cooperate to define the snap ring groove 150 that may receive the snap ring 130. The second hub portion 142 may be coupled to the first hub portion 140 in any suitable manner, such as with one or more fasteners 160 like a screw or bolt. It is also contemplated that the first hub portion 140 and the second hub portion 142 may cooperate to clamp onto the camshaft 24 to secure the hub 120 to the camshaft 24 without using a fastener, such as a snap ring 130. As such, the snap ring 130 and the snap ring groove 150 may be omitted in one or more embodiments.

The third hub portion 144 may be received in the first hub portion 140. For example, the third hub portion 144 may be received in an opening or pocket in the first hub portion 140. The third hub portion 144 may be disposed on an opposite side of the first hub portion 140 from the second hub portion 142. As such, the third hub portion 144 may be separated from the second hub portion 142 by the first hub portion 140.

The third hub portion 144 may or may not be fixedly coupled to the first hub portion 140. For example, the first hub portion 140 may rotate about the axis 58 with the camshaft 24 and with respect to the third hub portion 144 when the sensor bracket 124 is mounted to the third hub portion 144. As such, at least a portion of the sensor 122, the sensor bracket 124, and the third hub portion 144 may not rotate about the axis 58. Alternatively, the third hub portion 144 may be configured such that it does not rotate with respect to the first hub portion 140, such as in a configuration where the sensor bracket 124 is mounted to the sensor 122 and the sensor 122 permits the hub 120 to rotate with respect to the sensor 122. In at least one embodiment, the third hub portion 144 may have a disc-like configuration and may at least partially define a hub opening 162 that may extend along the axis 58.

The hub shaft 146 may extend along or may be disposed coaxially disposed with the axis 58. The hub shaft 146 may be disposed proximate the first hub portion 140 and may extend through the hub opening 162 of the third hub portion 144 toward the sensor 122. As such, the hub shaft 146 may extend away from the second hub portion 142 and may be completely spaced apart from the camshaft 24. The hub shaft 146 may be mounted to the first hub portion 140 such that the hub shaft 146 does not rotate with respect to the first hub portion 140. As such, the hub shaft 146 may rotate with the camshaft 24 due to the coupling of the hub 120 to the camshaft 24. The hub shaft 146 may be coupled to the hub 120 in any suitable manner. For instance, the hub shaft 146 may be coupled to the first hub portion 140 with a fastener 164, such as a screw. As such, the hub shaft 146 may rotate about the axis 58 with the first hub portion 140 and with the camshaft 24.

It is also contemplated that the hub shaft 146 may extend from or may be provided with the sensor 122 when the sensor 122 has a male configuration and the hub 120 has a female configuration. In such a configuration, the hub shaft 146 may be rotatably disposed on the sensor 122 and may be fixedly coupled to the hub 120.

The alignment feature 148 may receive the hub shaft 146 and may help align the hub shaft 146 with the sensor 122. In addition, the alignment feature 148 may also facilitate smooth rotation of the hub shaft 146 about the axis 58. As such, the alignment feature 148 may help position the hub shaft 146 in a manner that may reduce or inhibit axial or radial loading of the sensor 122 and may inhibit translation of forces that may damage the sensor 122. The alignment feature 148 may have any suitable configuration. For example, the alignment feature 148 may be configured as a bushing or a bearing that may extend around the axis 58 and the hub shaft 146. In at least one embodiment, the alignment feature 148 may be received in the hub opening 162 of the third hub portion 144. The alignment feature 148 may be retained by a fastener 166, such as a snap ring that may engage the third hub portion 144 to inhibit axial movement of the alignment feature 148 with respect to the hub shaft 146. The alignment feature 148 may also be configured to permit the third hub portion 144 to rotate with respect to the first hub portion 140. Such a configuration may allow the sensor 122, the sensor bracket 124, and the third hub portion 144, to remain stationary when the camshaft 24, the first hub portion 140, and the hub shaft 146 rotate about the axis 58.

The sensor 122 may generate a signal that may be indicative of rotation of the camshaft 24. Such a signal may be provided to a controller, such as a microprocessor-based controller, that may monitor and/or control operation of the brake assembly 10. The sensor 122 may be disposed proximate the hub 120. For example, the sensor 122 may be disposed along the axis 58 between the hub 120 and the sensor bracket 124. The sensor 122 may be of any suitable type. For example, the sensor 122 may be an angular position sensor, such as a Novotechnik RSC3200 series non-contacting magnetic sensor. The sensor 122 may have a male or female configuration. In FIG. 4, the sensor 122 is shown with a female configuration that may be disposed proximate and may receive the hub shaft 146. As such, the sensor 122 may have a socket or recess that may receive the hub shaft 146 and the socket or recess may be aligned with the axis 58. Alternatively, the sensor 122 may have a male configuration that may be received in the hub 120. The sensor 122 may indirectly detect rotation of the camshaft 24 via rotation of the hub shaft 146. The sensor 122 may be coupled to the hub 120. For example, the sensor 122 may be coupled to the third hub portion 144 in any suitable manner, such as with one or more fasteners 168, interlocking mating features, an adhesive, or combinations thereof.

Referring to FIGS. 3 and 4, the sensor bracket 124 may hold at least a portion of the camshaft sensor module 30 in a fixed position relative to the bracket assembly 22. For example, the sensor bracket 124 may hold the sensor 122 in a fixed position with respect to the brake wing 52 and/or camshaft tube 54. In at least one embodiment, the sensor bracket 124 may have a first bracket end 170 and a second bracket end 172.

The first bracket end 170 may be coupled to the hub 120 and/or the sensor 122. In FIG. 4, the sensor bracket 124 is shown coupled to the third hub portion 144, but it is contemplated that the first bracket end 170 may be coupled to another portion of the hub 120 in one or more embodiments. The first bracket end 170 may be coupled to the hub 120 and/or the sensor 122 in any suitable manner, such as with one or more fasteners 174, such as a screw.

The second bracket end 172 may be disposed opposite the first bracket end 170. The second bracket end 172 may be disposed closer to the camshaft tube 54 then the first bracket end 170. As such, the sensor bracket 124 may generally extend in a direction that extends parallel to the axis 58.

The second bracket end 172 may be directly or indirectly coupled to the bracket assembly 22. In FIG. 4, the second bracket end 172 is indirectly coupled to the camshaft tube 54 via a mounting sleeve 180 and a U-bolt 182. The mounting sleeve 180 may extend around and may receive the camshaft tube 54 and may help position and inhibit movement of the U-bolt 182. For example, the U-bolt 182 may be disposed in a groove 184 in the mounting sleeve 180 and may have one or more ends that may be coupled to the sensor bracket 124. For example, the ends of the U-bolt 182 may extend through corresponding holes in the sensor bracket 124 and the sensor bracket 124 may be secured to the U-bolt 182 with a nut. The sensor bracket 124 may be partially or completely disposed below the camshaft 24 and the axis 58 from the perspective shown in FIG. 4.

It is also contemplated that the sensor bracket 124 may be directly mounted to the camshaft tube 54, such as with one or more fasteners, an adhesive, welding, or the like. In addition, it is contemplated that the sensor bracket 124 may be mounted to another portion of the bracket assembly, such as the brake wing 52. For example, the sensor bracket 124 may be configured such that it extends to the side wall 70 of the brake wing 52. As such, the sensor bracket 124 may be fixedly positioned on the bracket assembly 22 to the left of the slack adjuster 26 from the orientation shown in FIG. 4, or between the slack adjuster 26 and the second end 92 of the camshaft 24.

The sensor bracket 124 may be completely spaced apart from and may not engage the flange wall 72 of the brake wing 52 to help inhibit transmission of vibrations or load forces to the sensor 122 that may occur during vehicle braking. More specifically, the sensor bracket 124 may not be coupled to the flange wall 72 so that vibrations or load forces that may damage of the sensor 122, such as axial or radial load forces, may not be transmitted to the sensor 122 via the sensor bracket 124 during vehicle braking. The sensor bracket 124 may also be completely spaced apart from the slack adjuster 26 so as not to interfere with actuation and operation of the slack adjuster 26.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A brake assembly comprising:
a camshaft that is configured to rotate about an axis;
a bracket assembly that has a camshaft tube that receives the camshaft; and
a camshaft sensor module that is disposed proximate an end of the camshaft, wherein the camshaft sensor module includes:

a hub that is disposed proximate the end of the camshaft, wherein the hub has a hub shaft;

a sensor that is disposed proximate the hub and that generates a signal indicative of rotation of the camshaft; and a sensor bracket that holds the sensor in a fixed position relative to the bracket assembly;

wherein the hub shaft rotates about and extends along the axis from the sensor toward the camshaft, and is spaced from the camshaft such that the hub shaft does not directly engage the camshaft.

2. The brake assembly of claim 1 wherein the hub is disposed along the axis between the end of the camshaft and the sensor.

3. The brake assembly of claim 1 further comprising a slack adjuster that is mounted to the camshaft, wherein the hub is disposed along the axis between the slack adjuster and the sensor.

4. The brake assembly of claim 3 wherein the slack adjuster is disposed between the camshaft tube and the hub.

5. The brake assembly of claim 3 wherein the camshaft has a cam that is disposed opposite the end of the camshaft and configured to actuate a brake pad assembly, wherein the sensor bracket is fixedly positioned on the bracket assembly between the slack adjuster and the cam.

6. The brake assembly of claim 1 wherein the hub is spaced apart from and rotates with respect to the camshaft tube.

7. The brake assembly of claim 1 wherein the sensor is disposed along the axis between the hub and the sensor bracket.

8. The brake assembly of claim 1 wherein the sensor bracket is coupled to the hub.

9. The brake assembly of claim 1 wherein the sensor bracket is coupled to the camshaft tube.

10. The brake assembly of claim 9 further comprising a mounting sleeve that receives the camshaft tube, wherein the sensor bracket is mounted to the mounting sleeve.

11. A brake assembly comprising:

a camshaft that is configured to rotate about an axis to actuate a brake pad assembly;

a bracket assembly that rotatably supports the camshaft; and a camshaft sensor module that is coupled to the camshaft, wherein the camshaft sensor module includes:

a hub that is coupled to the camshaft, wherein the hub has a hub shaft that extends along the axis and is spaced apart from and configured to rotate with the camshaft;

a sensor that engages the hub shaft and that generates a signal indicative of rotation of the camshaft; and a sensor bracket that is disposed proximate the sensor and that holds the sensor in a fixed position relative to the bracket assembly.

12. The brake assembly of claim 11 wherein the hub shaft does not rotate with respect to the camshaft, wherein the sensor is coupled to the hub shaft.

13. The brake assembly of claim 11 further comprising a snap ring that couples the hub to the camshaft.

14. The brake assembly of claim 11 wherein the hub includes a first hub portion and a second hub portion that cooperate to receive the camshaft.

15. The brake assembly of claim 14 wherein the hub shaft is coupled to the first hub portion.

16. The brake assembly of claim 14 further comprising a third hub portion that is disposed proximate the first hub portion, wherein the hub shaft extends through the third hub portion.

17. The brake assembly of claim 16 wherein the sensor is coupled to the third hub portion.

18. The brake assembly of claim 16 wherein the sensor bracket is coupled to the third hub portion.

19. The brake assembly of claim 16 wherein the first hub portion receives the third hub portion such that the first hub portion separates the second hub portion from the third hub portion.

20. The brake assembly of claim 16 further comprising an alignment feature that extends around the hub shaft, wherein the third hub portion receives the alignment feature.

* * * * *